Nov. 4, 1930.  J. H. NOBLE  1,780,764
ROTARY SHAFT PACKING
Filed Dec. 3, 1928
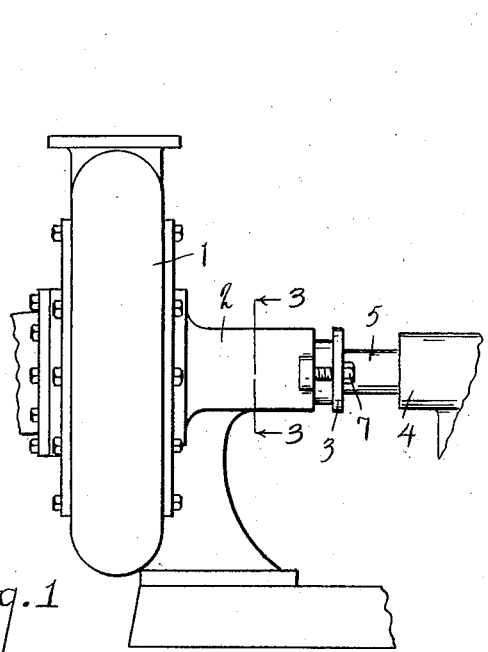
Fig.1
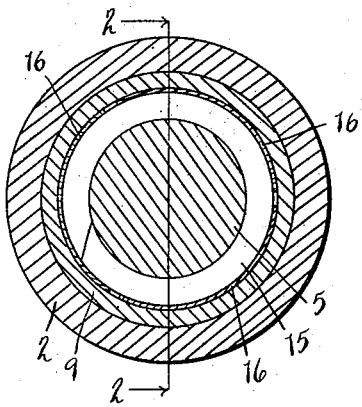
Fig.3
Fig.5
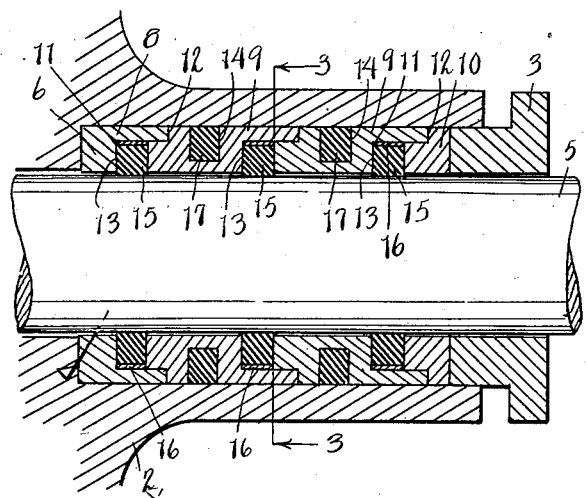
Fig.2
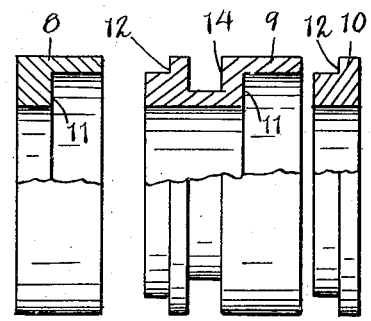
Fig.4
INVENTOR
John H. Noble,
BY Chappell Earl
ATTORNEYS Patented Nov. 4, 1930

1,780,764

UNITED STATES PATENT OFFICE

JOHN H. NOBLE, OF KALAMAZOO, MICHIGAN

ROTARY-SHAFT PACKING

Application filed December 3, 1928. Serial No. 323,220.

The main object of this invention is to provide an improved packing for centrifugal pumps and the like which is effective as a packing and at the same time very durable, requiring a minimum of attention.

A further object is to provide a packing having these advantages which may be easily installed and does not depend upon the skill of the workman installing the same for its efficiency.

Objects pertaining to details and economies of my invention will appear from the description to follow. The invention is defined in the claims.

A structure embodying the features of my invention is clearly illustrated in the accompanying drawing forming a part of this specification, in which:

Fig. 1 is an elevation of a centrifugal pump embodying my improved packing.

Fig. 2 is a detail longitudinal section on line 2—2 of Fig. 3, the shaft being shown in full lines.

Fig. 3 is a transverse section on line 3—3 of Figs. 1 and 2.

Fig. 4 is a detail view of certain of the packing ring holder members in separated relation.

Fig. 5 is a perspective view of one of the packing ring supporting or packing springs.

Referring to the drawing, 1 represents a centrifugal pump, 2 its packing box, 3 the gland thereof and 4 the pedestal for the shaft 5. The packing box has a shoulder 6 at its inner end, the gland being adjustably supported by the screws 7.

My improved packing comprises a plurality of annular packing ring holder members 8, 9, 9 and 10, the intermediate holder members 9 being duplicates, the member 8 being the inner member and the member 10 the outer member. It will be understood that a single intermediate member might be employed.

The members 8 and 9 are provided with internal shoulders 11 while the members 9 and 10 have external rabbets 12 receiving the shouldered ends of adjacent members 8 and 9, the ends abutting so that the members are held in spaced relation providing inwardly facing annular packing ring grooves or seats 13. The members 9 have external annular packing ring seats 14. Telescoping engagement of the parts hold them in axial alinement.

It is intended that these packing rings shall be a sliding or freely removable fit within the box, the purpose of the gland being merely to hold the members in their abutting relation and not to apply pressure to the packing rings.

The inner packing rings 15 are of resilient material, a rubber composition having been found entirely satisfactory. These packing rings are supported by blade springs 16 which are preferably flat in normal condition. The springs are bent into curved form as shown in Fig. 3 when inserted and urge the packing rings or gaskets toward the shaft.

The outer packing rings 17 are arranged in the outer seats 14 and normally project somewhat beyond the periphery of the holders so as to be in yielding contact with the wall of the stuffing box when assembled therein. As there is no movement between the rings 17 and the wall of the stuffing box there is consequently no wear, it only being necessary to compress the rings 17 sufficiently to secure a good sealing contact when they are inserted.

The wear of the shaft on the internal rings is found in practice on such installations as centrifugal pumps for handling water to be very slight, the springs not only insuring a sealing contact but taking up such slight wear as occurs.

I have illustrated and described my improvements in an installation in which I have successfully used the same commercially. I have not attempted to illustrate or describe various adaptations of my improvements which are possible as I believe the disclosure made will enable those skilled in the art to adapt my improvements as may be desired.

Having thus described my invention what I claim as new and desire to secure by Letters Patent is:

1. The combination with a shaft and a coacting stuffing box shouldered at its inner end and provided with a gland, annular packing ring holder members loosely fitting within said box arranged in end to end abutting relation and comprising inner and outer members and a plurality of intermediate members, the inner and intermediate members being internally shouldered at one end and the outer and intermediate members having external rabbets receiving the shouldered ends of the adjacent members providing internal annular packing ring grooves, the intermediate members having external annular packing ring grooves, and packing rings of resilient material arranged in said internal and external grooves.

2. The combination with a stuffing box, of a packing comprising a plurality of annular holder members, part of said holder members being internally shouldered, adjacent members being externally rabbeted to receive the shouldered ends of the adjacent member, the adjacent members coacting to provide internal packing ring grooves, said members being in end to end engagement and certain of the members having external packing ring grooves therein, packing rings arranged in said internal and external grooves, and springs arranged in said internal grooves to yieldingly urge the internal packing rings inwardly.

In witness whereof I have hereunto set my hand.

JOHN H. NOBLE.